(12) United States Patent
Teo et al.

(10) Patent No.: US 11,771,258 B2
(45) Date of Patent: Oct. 3, 2023

(54) VENT ORIFICE AND FILTER FOR BEVERAGE MACHINE

(71) Applicant: Keurig Green Mountain, Inc., Burlington, MA (US)

(72) Inventors: Choon Meng Teo, Johor (MY); Yee Leong Pang, Johor (MY); Kim Lai Wong, Johor (MY); John Couture, Burlington, MA (US); Richard Pasquini, Alfred, ME (US)

(73) Assignee: Keurig Green Mountain, Inc., Burlington, MA (US)

( * ) Notice: Subject to any disclaimer, the term of this patent is extended or adjusted under 35 U.S.C. 154(b) by 709 days.

(21) Appl. No.: 16/619,567

(22) PCT Filed: Jun. 5, 2018

(86) PCT No.: PCT/US2018/035956
§ 371 (c)(1),
(2) Date: Dec. 5, 2019

(87) PCT Pub. No.: WO2018/226623
PCT Pub. Date: Dec. 13, 2018

(65) Prior Publication Data
US 2020/0138231 A1 May 7, 2020

Related U.S. Application Data

(60) Provisional application No. 62/515,431, filed on Jun. 5, 2017.

(51) Int. Cl.
*A47J 31/32* (2006.01)
*A47J 31/46* (2006.01)
(Continued)

(52) U.S. Cl.
CPC ............... *A47J 31/32* (2013.01); *A23F 5/262* (2013.01); *A47J 31/06* (2013.01); *A47J 31/468* (2018.08);
(Continued)

(58) Field of Classification Search
CPC ... A47J 31/32; A47J 31/24; A23F 5/24; A23F 5/26; A23F 5/262
(Continued)

(56) References Cited

U.S. PATENT DOCUMENTS 3,269,599 A * 8/1966 Austin ................. B67D 1/0895
222/63
5,297,472 A * 3/1994 Suzuki .................. A47J 31/408
99/289 T
(Continued)

OTHER PUBLICATIONS

International Search Report and Written Opinion dated Sep. 27, 2018 in connection with International Application No. PCT/US2018/035956.
(Continued)

*Primary Examiner* — Reginald Alexander
(74) *Attorney, Agent, or Firm* — Wolf, Greenfield & Sacks, P.C.

(57) ABSTRACT

A method and apparatus for venting a liquid supply of a beverage machine, e.g., by permanently open orifice and/or pressure relief valve. The orifice may always vent a heater tank, even while liquid is delivered to the tank by a liquid pump and/or while the tank is pressurized by an air pump to deliver liquid from the tank. A filter may be positioned between a heater tank and orifice and/or air pump. The pressure relief valve may be positioned between the liquid pump and the inlet side of the heater tank, e.g., so relatively cool water is released by the pressure relief valve when open.

14 Claims, 4 Drawing Sheets

(51) Int. Cl.
*A47J 31/06* (2006.01)
*A47J 31/56* (2006.01)
*A23F 5/26* (2006.01)
*A47J 31/24* (2006.01)
*A23F 5/24* (2006.01)

(52) U.S. Cl.
CPC ................ *A47J 31/56* (2013.01); *A23F 5/24* (2013.01); *A47J 31/24* (2013.01)

(58) Field of Classification Search
USPC ....................................................... 99/302 R
See application file for complete search history.

(56) References Cited

U.S. PATENT DOCUMENTS

| | | | |
|---|---|---|---|
| 8,387,516 B1 | 3/2013 | Reynolds | |
| 2006/0230946 A1* | 10/2006 | Cheng | A47J 31/32 99/300 |
| 2011/0200726 A1* | 8/2011 | Tinkler | A47J 31/32 426/431 |
| 2014/0030404 A1 | 1/2014 | Sullivan et al. | |
| 2016/0220062 A1 | 8/2016 | Hanes et al. | |
| 2018/0353001 A1* | 12/2018 | Rotta | A47J 31/4489 |
| 2019/0038064 A1* | 2/2019 | Kihara | A47J 31/465 |

OTHER PUBLICATIONS

International Preliminary Report on Patentability dated Dec. 19, 2019 in connection with International Application No. PCT/US2018/035956.

\* cited by examiner

VENT ORIFICE AND FILTER FOR BEVERAGE MACHINE

CROSS-REFERENCE TO RELATED APPLICATIONS

This Application is a national stage filing under 35 U.S.C. § 371 of International Patent Application Serial No. PCT/US2018/035956, filed Jun. 5, 2018, which claims the benefit of U.S. Provisional Application Ser. No. 62/515,431, filed Jun. 5, 2017.

BACKGROUND

1. Field of Invention

This invention relates to beverage forming systems, such as coffee brewers that use a liquid to form a coffee beverage.

2. Related Art

Beverage forming systems that use a liquid, such as water, to form a beverage are well known. For example, U.S. Pat. No. 8,361,527 discloses a beverage forming system that uses a beverage cartridge containing a beverage material to make a beverage by introducing liquid into the cartridge. Liquid provided to the cartridge may be heated in a tank prior to delivery to the cartridge.

SUMMARY OF INVENTION

Aspects of the invention relate to a beverage forming apparatus including a brew chamber arranged to hold a beverage ingredient. For example, the brew chamber may include a cartridge holder arranged to hold a cartridge containing the beverage ingredient such that liquid is deliverable via a liquid inlet to the cartridge for combining with the beverage ingredient to form a beverage, and beverage may exit the brew chamber via a liquid outlet. A liquid supply system may be arranged to provide the liquid to the liquid inlet, and an air pump may be fluidly coupled to the liquid supply system to deliver air to the liquid supply system to pressurize at least a portion of the liquid supply system and move liquid in the fluid supply system to the liquid inlet. A permanently open orifice may be fluidly coupled to the liquid supply system and arranged to vent pressure from a portion of the liquid supply system, and an air filter may be fluidly coupled to the orifice and to the air pump such that air delivered from the air pump passes through the air filter and to the liquid supply system and such that fluid passing from the liquid supply system to the orifice passes through the air filter. Air may pass from the air pump to the orifice without passing through the filter.

In some embodiments, the liquid supply system includes a heater tank in which liquid is heated, and the orifice is fluidly coupled to a gas line connected to an upper portion of the heater tank. The air filter may have an inlet side arranged to receive air from the air pump and an outlet side arranged to deliver filtered air to the liquid supply system and may be positioned such that the air filter is fluidly positioned in the gas line between the heater tank and the orifice. As a result, air delivered to the heater tank by the air pump may always be vented by the permanently open orifice and may pass from the air pump to the orifice without passing through the filter. In one embodiment, the air filter and the orifice are incorporated into a single part having an inlet port coupled to the inlet side of the air filter and an inlet side of the orifice, an outlet port coupled to an outlet side of the orifice, and a common port coupled to the outlet side of the air filter. The air pump may be coupled to the inlet port, and the heater tank to the common port.

In some embodiments, the liquid supply system includes a delivery line coupled between the heater tank and the liquid inlet and arranged to deliver heated liquid from the heater tank to the liquid inlet. The delivery line may be arranged such that pressure in the heater tank created by the air pump in delivering air to the heater tank causes liquid in the heater tank to flow along the delivery line and to the liquid inlet, and the air pump may be arranged to deliver air to the heater tank at a flow rate higher than a flow rate at which the orifice vents the heater tank. This may allow pressure to build in the tank so that liquid is forced to move to the brew chamber. In one embodiment, the delivery line includes a conduit that extends from the upper portion of the heater tank to a position between a top and a bottom of the heater tank.

In some embodiments, a liquid pump may be arranged to deliver liquid to the heater tank, and the orifice may vent pressure from the heater tank while liquid is delivered to the heater tank by the water pump. This may allow the liquid pump to provide liquid to the tank without causing liquid to be moved to the brew chamber, e.g., because the tank is vented by the orifice. In one embodiment, the orifice is arranged to vent pressure from the portion of the liquid supply system to ambient pressure, and the orifice has a size of 0.25 mm.

In another embodiment, a method of forming a beverage includes providing a beverage ingredient in a brew chamber of a beverage forming apparatus, where the beverage ingredient is arranged to form a beverage when combined with a liquid. Liquid may be pumped to a heater tank of a liquid supply system, and pressure may be vented from the heater tank during the pumping of liquid to the heater tank. In one embodiment, pressure may be vented from the heater tank via a gas line connected to the heater tank and that includes a permanently open orifice. Pressurized air may be delivered from an air pump to the heater tank via an air filter and the gas line such that the heater tank is pressurized and liquid is delivered to the brew chamber to combine with the beverage ingredient. For example, the air pump may generate pressure in the heater tank that forces heated liquid to move from the tank to the brew chamber. This may occur even though the orifice continuously vents the heater tank.

In one embodiment, the gas line is connected to an upper portion of the heater tank, and liquid may be delivered to the brew chamber via a delivery line coupled between the heater tank and the brew chamber. In some cases, the delivery line may include a conduit that extends from the upper portion of the heater tank to a position between a top and a bottom of the heater tank.

In some embodiments, the air filter has an inlet side arranged to receive air from the air pump and an outlet side arranged to deliver filtered air to the heater tank. Also, the air filter may be fluidly coupled to the gas line between the heater tank and the orifice so that fluid vented from the heater tank passes through the air filter prior to passing through the orifice. As noted above, the air filter and the orifice may be incorporated into a single part having an inlet port coupled to the inlet side of the air filter and an inlet side of the orifice, an outlet port coupled to an outlet side of the orifice, and a common port coupled to the outlet side of the air filter.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to certain illustrative embodiments and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
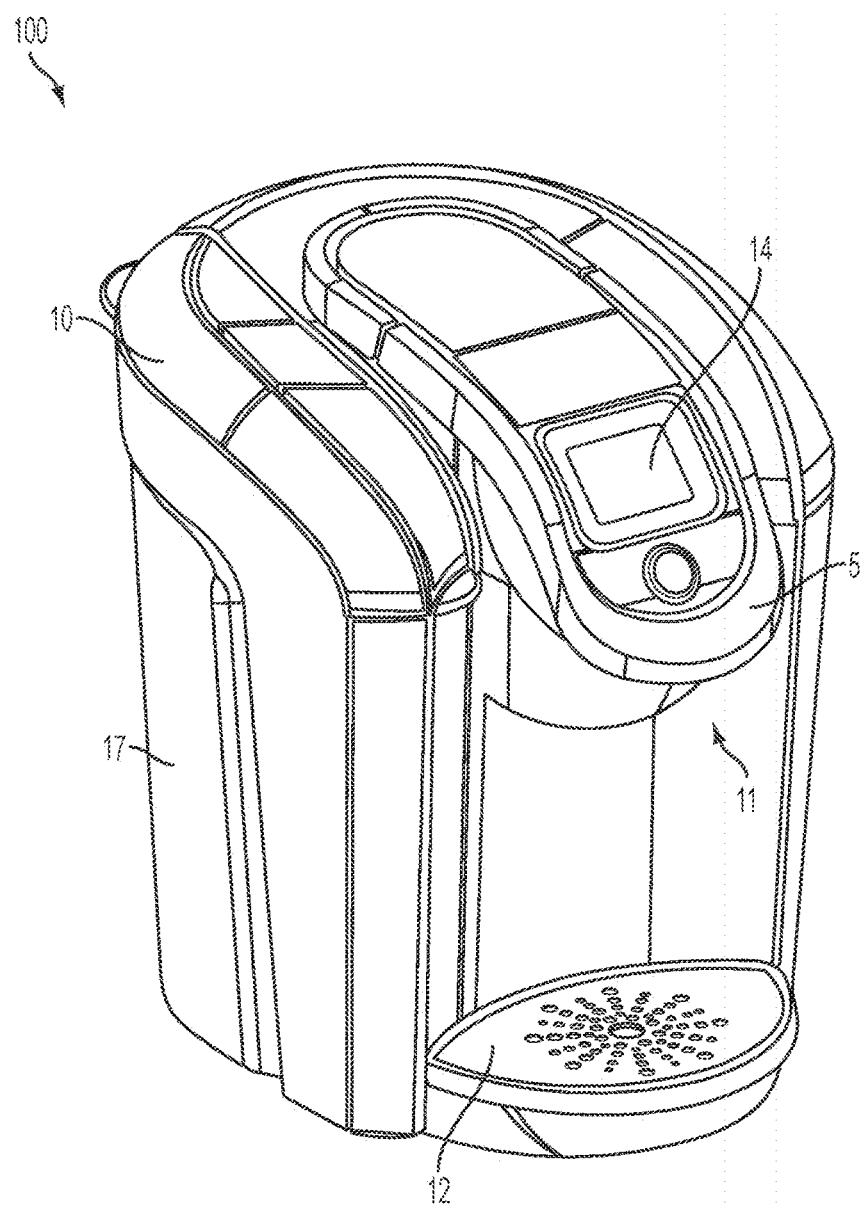
FIG. 1 is a front perspective view of a beverage forming apparatus in an illustrative embodiment.
Figure 2:
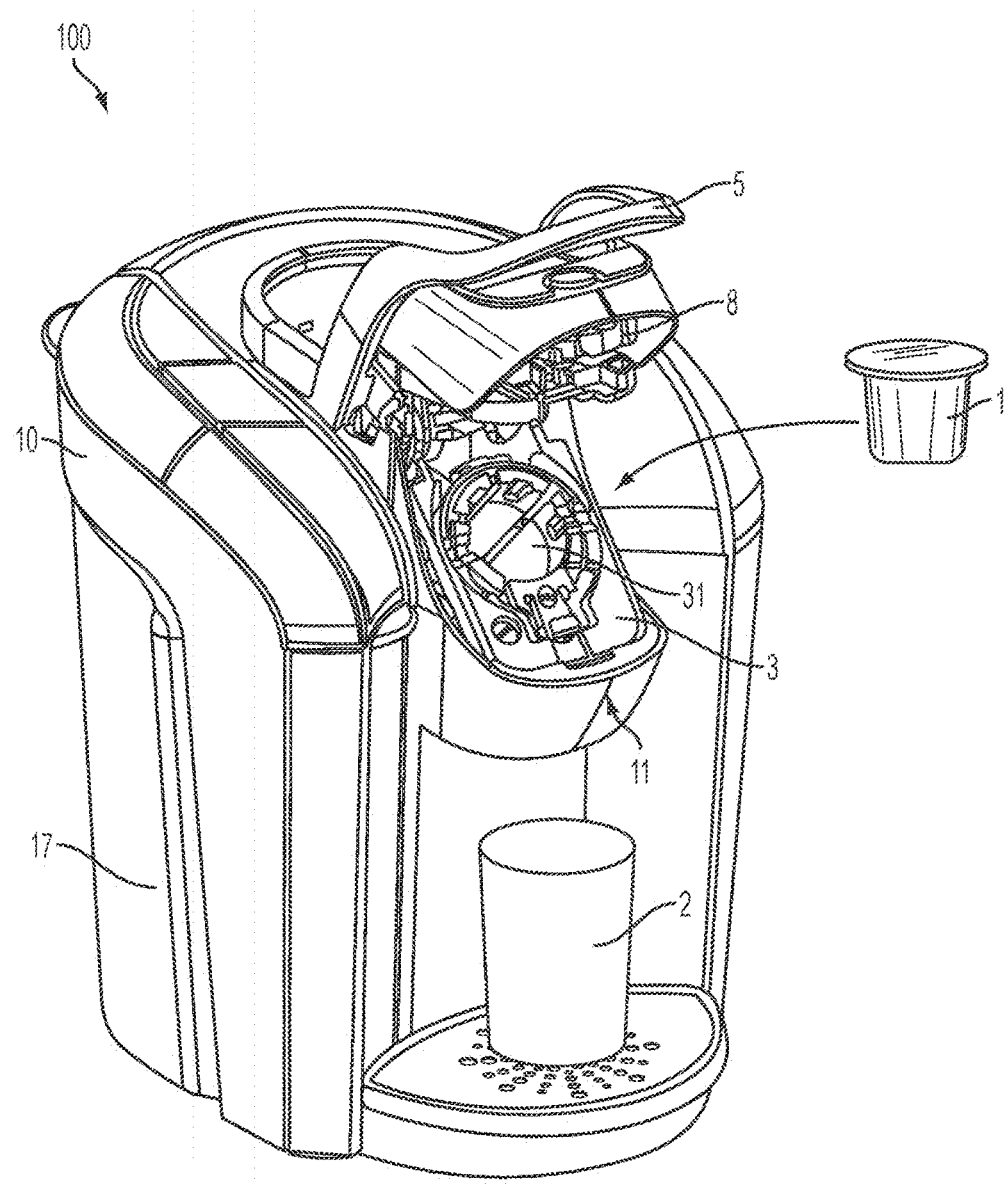
FIG. 2 is a front perspective view of the FIG. 1 embodiment with the cartridge holder exposed to receive a cartridge.

FIGS. 1 and 2 show a perspective view of a beverage forming apparatus 100 in an illustrative embodiment that incorporates aspects of the invention. Although the beverage forming apparatus 100 may be used to form any suitable beverage, such as tea, coffee, other infusion-type beverages, beverages formed from a liquid or powdered concentrate, soups, juices or other beverages made from dried materials, in this illustrative embodiment the apparatus 100 is arranged to form coffee or tea beverages. As is known in the art, a beverage cartridge 1 may be provided to the apparatus 100 and used to form a beverage that is deposited into a container 2, such as a user's cup. The cartridge 1 may be manually or automatically placed in a cartridge holder 3 of a beverage forming station 11 of the beverage forming machine 10. For example, the cartridge holder 3 may be exposed to receive the cartridge 1 at an opening 31 of the holder 3 when the user operates a handle 5 or other actuator to open the beverage forming station or brew chamber 11. In this embodiment, movement of the handle 5 or other actuator may cause a cover 8 to move relative to the cartridge holder 3 (or the cover 8 and holder 3 to otherwise move relative to each other, e.g., by having the holder 3 move) to expose the holder 3 for reception of a cartridge 1. With the cartridge 1 placed in the cartridge holder 3, the actuator 5 may be operated to close the brew chamber 11, e.g., so that the cover 8 moves to cooperate with the holder 3 to at least partially enclose the cartridge 1 so water or other precursor liquid can be introduced into the cartridge 1 to form a beverage. For example, with the cartridge 1 held in the beverage forming station 11 by the cartridge holder 3, the cartridge 1 may be pierced to form inlet and outlet openings through which water or other precursor liquid enters the cartridge 1 and beverage that exits the cartridge 1, respectively. U.S. Pat. No. 8,361,527 describes a cartridge and a system for introducing liquid into the cartridge that may be used in embodiments of this invention, and is hereby incorporated by reference in its entirety. Of course, aspects of the invention may be employed with any suitably arranged apparatus 100, including drip-type coffee brewers, carbonated beverage machines, and others arranged to form a beverage regardless of how the beverage is formed. For example, a cartridge 1 may include any suitable materials to form a beverage, such as a carbon dioxide source used to carbonate water, a beverage mix, etc. Alternately, beverage ingredients need not be contained in a cartridge 1, but rather may be provided to the beverage forming station 11 or other brew chamber in a loose or uncontained form. In such embodiments, the brew chamber 11 may include a disposable or reusable filter to hold the beverage ingredient so that water or other liquid can be introduced to the brew chamber via an inlet and combined with the beverage ingredient to form a beverage that flows through the filter to an outlet of the brew chamber 11.

If used with the apparatus 100, cartridges may be arranged in different ways, and their configuration may depend at least in part on the nature of how a beverage ingredient in the cartridge is used to form a beverage. As will be understood, the cartridge 1 may contain any suitable beverage medium or ingredient, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutriceuticals, etc.), and/or other beverage-making material (such as powdered milk or other creamers, sweeteners, thickeners, flavorings, and so on). In some embodiments, a cartridge 1 may include a container that includes an interior space having a first chamber and a second chamber that are separated by a filter. The container may have a frustoconical cup shape with a sidewall and a top opening covered by a lid, although other arrangements are possible. Also, the container need not necessarily have a defined shape, as is the case with some beverage sachets and pods.

When using a cartridge 1 to form a beverage, the lid and/or the container may be pierced to introduce liquid into the cartridge and receive beverage from the cartridge. (As used herein, "beverage" refers to a liquid substance intended for drinking that is formed when a liquid interacts with a beverage medium or ingredient. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.) The cartridge may be pierced in the brew chamber 11 by an inlet piercing element (e.g., a needle, multiple needles, a shower head, a solid or non-hollow needle, a cone, a pyramid, a knife, a blade, etc.) so that water or other liquid may be injected into the cartridge 1. Similarly, the cartridge may be pierced by an outlet piercing element (e.g., including any one of the elements mentioned above regarding the inlet piercing element) to form one or more outlet openings to allow beverage to exit the cartridge.

In this embodiment, the beverage forming machine 10 includes a housing 17 that houses and/or supports components of the machine 10, such as a user interface 14 used to receive information from and provide information to a control system, and defines a container receiving area 12 at which the container 2 is positionable to receive beverage dispensed by the machine 10 via a beverage outlet. Thus, at the container receiving area 12, the container 2 is associated with the machine 10 to receive a dispensed beverage and may be supported by the housing 17. The container 2 may be received at the container receiving area 12 so that the container 2 is at least partially surrounded by the housing 17, or the container 2 may be more exposed when at the container receiving area 12, as shown in FIG. 2. In some embodiments, the container receiving area 12 may include a drip tray arranged to receive and hold liquid that spills from the container 2 or is discharged from the beverage outlet of the brew chamber 11.

Figure 3:
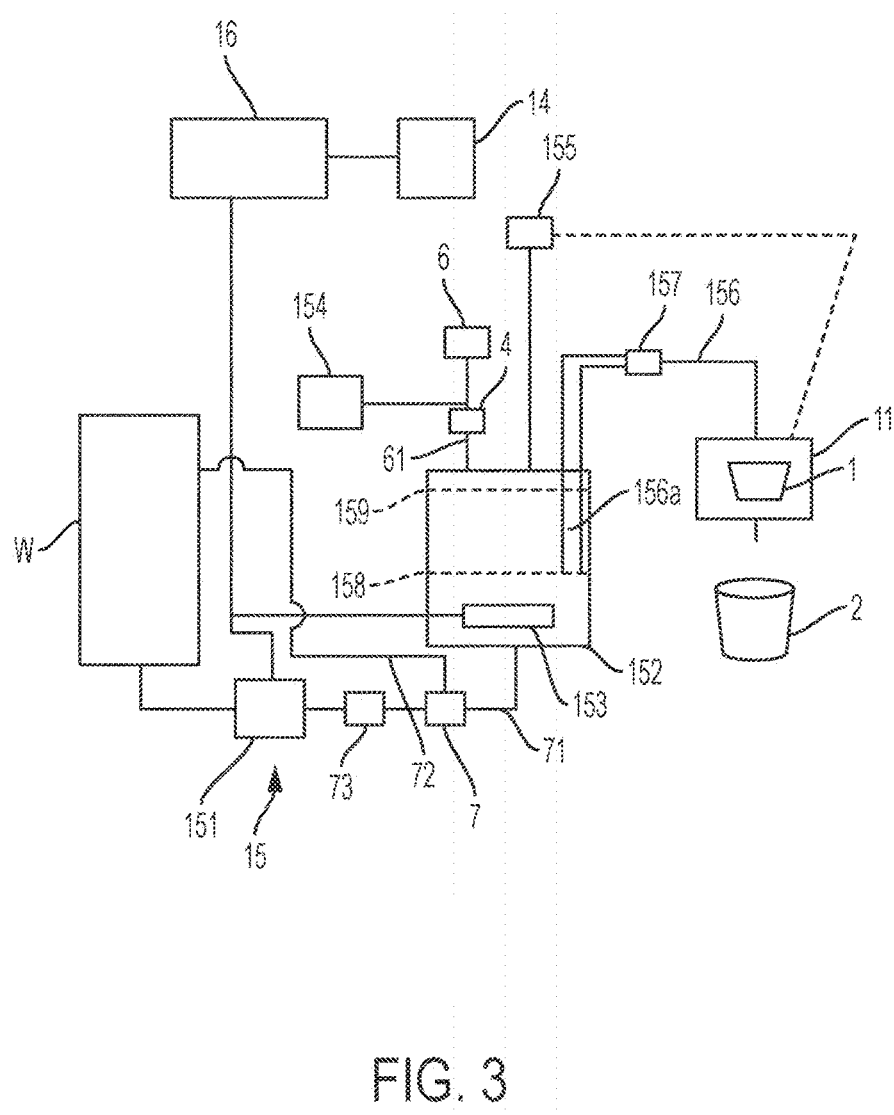
FIG. 3 is a schematic diagram of components of a beverage forming apparatus in an illustrative embodiment.

FIG. 3 shows a schematic block diagram of various components that may be included in a beverage forming apparatus 100 in one illustrative embodiment. Those of skill in the art will appreciate that a beverage forming apparatus 100 may be configured in a variety of different ways, and thus aspects of the invention should not be narrowly interpreted as relating only to one type of beverage forming apparatus. In this embodiment, water or other precursor liquid may be provided by a liquid supply 15 to mix with a beverage ingredient at the brew chamber 11. The liquid supply 15 in this embodiment controls the volume of liquid provided to the brew chamber 11 by filling a heater tank 152 to a liquid dispense level 159 and then pressurizing the tank 152 by way of an air pump 154 so that liquid in the heater tank 152 is forced out of the delivery line 156 to a liquid inlet of the brew chamber 11. A check valve 157 may be provided in the delivery line 156 to allow flow from the heater tank 152 to the brew chamber 11, but resist flow from the brew chamber 11 to the heater tank 152. In this embodiment, the volume of liquid delivered to the brew chamber 11 is equal to the volume in the tank 152 between the liquid delivery level 159 and a post-delivery level 158 at a bottom of a conduit 156a in the tank 152 that extends downwardly from a top or upper portion of the tank to a location between the top and bottom of the tank 152. Note that while only one liquid dispense level 159 is shown, two or more liquid dispense levels 159 may be used to allow the system to deliver different volumes of liquid to the brew chamber 11. In other embodiments, the delivery line 156 may fluidly communicate with a bottom portion of the heater tank 152, e.g., so that the heater tank 152 is completely or substantially emptied.

In accordance with an aspect of the invention, an air filter 4 is fluidly coupled to the air pump 154 so that pressurized air delivered from the air pump 154 passes through the air filter 4 before entering the heater tank 152. Also, in accordance with an aspect of the invention, the air filter 4 is fluidly coupled to a permanently open orifice 6 such that fluid vented from the heater tank 152 (e.g., during filling of the tank 152 or heating of liquid) passes through the air filter 4 before passing to the orifice 6. Thus, the air filter 4 has an inlet side arranged to receive air from the air pump 154 and an outlet side arranged to deliver filtered air to the liquid supply system 15 such that the air filter 4 is fluidly positioned in a gas line between the heater tank 152 and the orifice 6. Such an arrangement may help resist passing unwanted materials from the air pump 154 to the heater tank 152. For example, if the air pump 154 draws in dust from ambient air, the dust may be removed from the air flow to the tank 152 by the filter 4. This may help keep such materials from being introduced into the water or other liquid in the heater tank 152. In addition, or alternately, the filter 4 may help resist the passage of moisture or other unwanted materials to the air pump 154 and/or the orifice 6. For example, the orifice 6 and the air filter 4 may be fluidly coupled to an upper portion of the heater tank 152 by a gas line 61 attached at or near a top of the heater tank 152. The heater tank 152 may have a gas or vapor space such that water heated in the heater tank 152 may produce water vapor that flows from the heater tank 152 to the air filter 4 and then to the orifice 6. Also, unwanted particles, such as portions of scale deposited formed in the heater tank 152 may pass from the heater tank 152 to the air filter 4. Water vapor may cause problems such as contaminating portions of the air pump 154, encouraging mold or other growth, etc., and particles in the fluid flow from the heater tank 152 may clog the orifice 6. The air filter 4 may be arranged to resist the flow of water vapor and/or other materials (such as scale particles) through the air filter 4, and thus help prevent the movement of water vapor to the air pump 154 and/or clogging of the orifice 6.

It should be appreciated that use of an air filter fluidly positioned between a heater tank and a permanently open orifice may be employed in embodiments that do not use an air pump to deliver liquid from the heater tank 152 to the brew chamber 11. Instead, an orifice 6 may be used to vent the heater tank 152 and the air filter 4 used to filter fluid that may pass from the tank 152 to the orifice 6 even though liquid may move from the heater tank 152 in other ways, such as by operating the liquid pump 151, by gravity, etc.

Figure 4:
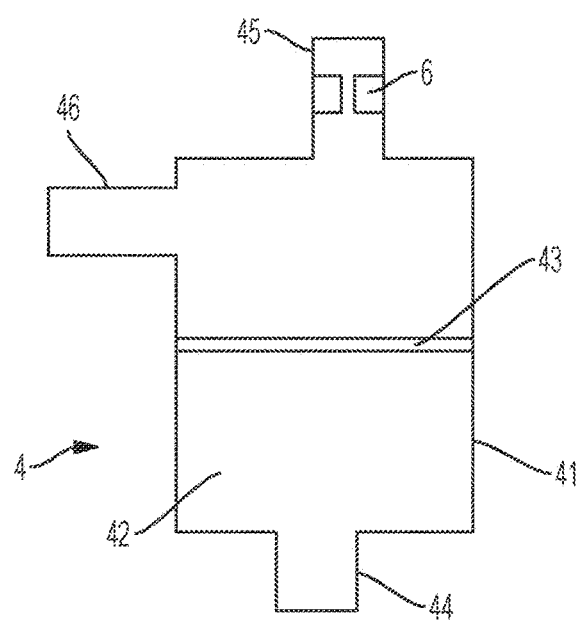
FIG. 4 is a cross sectional view of an integrated air filter and orifice assembly.

In some embodiments, the air filter 4 and the orifice 6 may be incorporated into a single part. For example, as shown in FIG. 4, a housing 41 may define an internal space 42 in which an air filter element 43 is located. The air filter element 43 may be or include a porous filter paper, e.g., made of woven or non-woven cellulose or polymer fibers, or any other suitable component or components. The housing 41 may have an inlet port 46 fluidly coupled to the inlet side of the air filter element 43 and an inlet side of the orifice 6, an outlet port 45 coupled to an outlet side of the orifice 6 (an upper side of the orifice 6 in FIG. 4), and a common port 44 coupled to the outlet side of the air filter 43. The common port 44 may be fluidly coupled to the heater tank 152 via a line, e.g., a conduit or gas line 61, such that pressurized air entering the housing 41 via the inlet port 46 from the air pump 154 may pass through the air filter element 143 and flow out of the common port 44 to the heater tank 152. The pressurized air may also flow through the orifice 6 to the outlet port 45, and the outlet port 45 may be fluidly coupled to a line that directs fluid in the line to the ambient environment, a drip tray, a water reservoir or other suitable location. However, the orifice 6 may be suitably sized so that the air pump 154 is capable of delivering air at a suitable flow rate and pressure to cause liquid in the heater tank 152 to move to the brew chamber 11 via the delivery line 156. In some embodiments, the orifice 6 has a size of 0.25 mm and the air pump 154 has a maximum output pressure of 4 psi (at zero flow rate), and a normal operating pressure of 2.5 psi at a flow rate of about 5-6 ml/sec, e.g., 5.4 ml/sec. Thus, the orifice 6 may continuously vent the heater tank 152 while the air pump 154 delivers air to pressurize the tank 152 and cause liquid to flow to the brew chamber 11, but the orifice 6 and the air pump 154 may be arranged so that air is delivered to the tank 152 at a suitable pressure and flow rate to move liquid to the brew chamber 11. In some embodiments, a volume of liquid of about 250 ml may be moved to the brew chamber in about 45-60 seconds. The check valve 157 may have a crack, or opening pressure of about 0.5 psi such that the check valve 157 opens with pressure in the heater tank 152 produced by the air pump 154.

Forming the air filter 4 and orifice 6 as a single part, e.g., with an integral housing 41 that supports an air filter element 43 and an orifice 6, may simplify assembly and/or operation of the beverage machine 10, as well as potentially reduce costs. In some embodiments, the filter element 43 and the orifice 6 element may be co-molded or otherwise secured to, or formed at the same time as, the housing 41. In other embodiments, one of the filter element 43 or orifice 6 element may be co-molded, formed unitarily with, or otherwise attached to the housing 41 or a portion of the housing 41, and the housing 41, filter element 43 and orifice 6 may be later assembled together. For example, the orifice 6 may be molded as part of an upper housing 41 section, and the filter element 43 may be attached to a lower housing 41 section that is made separately from the upper housing 41 section. The upper and lower sections may be assembled together, e.g., at a portion of the housing 41 between the filter element 43 and the orifice 6, so that the air filter 4 and orifice 6 are integrated into a single part.

In the embodiment of FIG. 3, the liquid supply 15 provides liquid to the tank 152 via a liquid pump 151 that is coupled to a source W. The source W may have any suitable arrangement, e.g., may provide liquid from a storage tank or reservoir like that shown schematically in FIG. 3, a mains water supply or other source. Thus, in some cases, the liquid provided to the tank 152 may vary in temperature by a wide degree depending on various factors, such as time of year, a temperature of a room in which the machine 10 is located, etc. For example, if the source W is a reservoir that is filled by a user, the temperature of liquid in the reservoir may vary between room temperature (e.g., if liquid sits in the reservoir for an extended time) and a cooler temperature (e.g., if the reservoir has just been filled with water that is dispensed from a tap).

To provide liquid to the tank 152 in this embodiment, the liquid pump 151 is controlled by the control circuit 16 to provide a desired volume of liquid to the tank 152. For example, if the tank 152 is empty or at the post-dispense level 158, the liquid pump 151 may be operated until a conductive probe or other liquid level sensor in the tank 152 provides a signal to the control circuit 16 that indicates when liquid arrives at the dispense level 159. In other embodiments, the liquid pump 151 may be arranged to provide a specified volume of liquid, e.g., the liquid pump 151 may be a piston pump, diaphragm pump, syringe pump or other type of pump that delivers a known volume of liquid for each pump stroke or other operation such the control circuit 16 can cause the liquid pump 151 to operate a specified number of cycles or a specified time to deliver a desired volume of liquid. Alternately, the system may include a flow meter or other device to detect liquid flow from the liquid pump 151 and thereby determine a volume of liquid delivered to the heater tank 152. This information may be used to control the liquid pump 151 to stop when a desired amount of liquid has been delivered.

Although in this embodiment a liquid level sensor is used including a conductive probe capable of contacting liquid in the tank 152 and providing a signal (e.g., a resistance change) indicative of liquid being present at respective dispense level 159 in the tank 152, a liquid level sensor may be arranged in other ways. For example, the sensor may include a microswitch with an attached float that rises with liquid level in the tank 152 to activate the switch. In another embodiment, the liquid level sensor may detect a capacitance change associated with one or more liquid levels in the tank, may use an optical emitter/sensor arrangement (such as an LED and photodiode) to detect a change in liquid level, may use a pressure sensor, may use a floating magnet and Hall effect sensor to detect a level change, and others. Thus, a liquid level sensor is not necessarily limited to a conductive probe configuration. Moreover, the liquid level sensor may include two or more different types sensors to detect different levels in the tank. For example, a pressure sensor may be used to detect liquid at one dispense level (e.g., complete filling of the tank 152 may coincide with a sharp rise in pressure in the tank 152 that is detected by the pressure sensor), while a conductive probe may be used to detect liquid at another dispense level, such as dispense level 159.

In accordance with an aspect of the invention, a pressure relief valve may be provided between the liquid pump and the heater tank. This positioning, optionally in combination with other machine features, may provide various advantages. For example, positioning the pressure relief valve upstream of the heater tank 152 may allow the pressure relief valve to vent to a location at which a user has access, but with reduced concern for discharging hot water from the pressure relief valve. That is, pressure in the heater tank 152 (possibly caused by heating of liquid in the tank 152) may cause the pressure relief valve 7 to open to release pressure in the supply line 71 between the liquid pump 151 and the heater tank 152. However, since the pressure relief valve 7 is located in the supply line 71, which contains unheated liquid, and is in fluid communication with a lower portion of the heater tank 152, which has water at a lower temperature than other portions of the heater tank 152, fluid released by the pressure relief valve 7 may be at a relatively low temperature. In some embodiments, as in FIG. 3, the pressure relief valve 7 may vent to a drain line 72 that expels liquid into the water reservoir W. However, the pressure relief valve 7 may vent to other locations to which a user has access, such as at a drip tray, or to other locations not accessible by a user, such as at a location internal to the housing 17.

In accordance with another aspect of the invention, the pressure relief valve may be arranged so that an opening pressure at which the pressure relief valve vents pressure from the supply line may be less than a maximum pressure that the liquid pump can produce in the supply line, but the liquid pump and other system components may be arranged to provide liquid to the heater tank to fill the tank at a pressure below a pressure required to deliver liquid to the brew chamber. In some embodiments, the orifice 6 may vent the heater tank 152 at a flow rate such that the liquid pump 151 can fill the tank 152 without causing the pressure relief valve 7 to open or causing flow to the brew chamber. For example, the liquid pump 151 may deliver liquid at a flow rate (e.g., about 5 ml/sec or less) and pressure (e.g., a normal operating pressure of about 2 psi) so that the heater tank 152 can be filled, but liquid is not delivered via the delivery line 156 to the brew chamber 11. The orifice 6 may vent the heater tank 152 sufficiently so pressure in the tank 152 remains at or below a pressure required to deliver liquid to the brew chamber 11 for the pressure and flow rate of the liquid pump 151. This may help the system ensure that the heater tank 152 is suitably filled with water or other liquid during a fill operation. That is, the liquid pump 151 may be capable of producing a relatively high pressure to force water into the heater tank 152, yet the pressure relief valve 7 will not open to vent pressure from the supply line 71. Pressure in the heater tank 152, and consequently in the supply line 71, may be vented by the orifice 6, allowing the heater tank 152 to fill with liquid without forcing liquid to flow out via the delivery line 156 as well. Rather than opening because of pressure created by the liquid pump 151, the pressure relief valve 7 may open for other reasons, such as unusually high pressures created by heating liquid in the heater tank 152.

In some embodiments the air pump 154 may be arranged such that a maximum pressure of the air pump 154 is below the opening pressure of the pressure relief valve 7. For example, even if the orifice 6 is clogged and prevents venting while the air pump 154 is delivering pressurized air into the heater tank 152, the pressure relief valve 7 will not open. This may prevent heated liquid from being vented by the pressure relief valve 7. In one example, the maximum pressure of the air pump 154 may be about 4 psi, while the opening pressure of the pressure relief valve 7 is about 15 psi. (The air pump 154 may generate pressure in the heater tank 152 of about 2.5 psi during normal operation when forcing water to flow from the tank 152 to the brew chamber 11.) With this configuration, the pressure relief valve may open only during high pressure events related to liquid pump operation (the liquid pump 151 may have a maximum operating pressure of about 30 psi), and when the pressure relief valve opens, only relatively cool liquid may be vented by the pressure relief valve 7 because of the valve's 7 placement between the liquid pump 151 and the heater tank 152.

In some embodiments, the pressure relief valve 7 may have an opening pressure that is higher than the opening pressure of the check valve 157. For example, the opening pressure of the pressure relief valve 7 may be about 15 psi, while the crack or opening pressure of the check valve 157 may be about 0.5 psi (e.g., 0.3 to 0.7 psi). This may allow liquid to be directed from the heater tank 152 to the brew chamber 11 when the air pump 154 pressurizes the tank 152 without releasing liquid from the pressure relief valve 7. As noted above, the air pump 154 may deliver pressurized air to the heater tank 152 at a pressure and flow rate (e.g., about 5 ml/sec or more) suitable to generate about 2.5 psi in the heater tank 152 while the heater tank 152 is vented by the orifice 6 and liquid is delivered to the brew chamber 11. In this embodiment, the pressure relief valve 7 has a fixed opening pressure, although in other embodiments the pressure relief valve 7 may have a variable or controllable opening pressure, e.g., which may be controlled by the control circuit 16. Also provided in this embodiment is a check valve 73 between the pressure relief valve 7 and the liquid pump 151. This check valve 73 may permit flow from the pump 151 to the heater tank 152, but resist flow from the heater tank 152 to the pump 151. This may help ensure that pressure vented by the pressure relief valve 7 is vented by the pressure relief valve 7 and not through the pump 151.

Liquid in the tank 152 may be heated by way of a heating element 153 whose operation is controlled by the control circuit 16 using input from a temperature sensor or other suitable input. Of course, heating of the liquid is not necessary, and instead (or additionally) the apparatus 100 may include a chiller to cool the liquid, a carbonator to carbonate the liquid, or otherwise condition the liquid in a way that alters the volume of liquid in the tank 152. (Generally speaking, components of the liquid supply 15 that heat, cool, carbonate or otherwise condition liquid supplied to the brew chamber 11 are referred to as a "liquid conditioner.")

In the embodiment of FIG. 3, the beverage machine 10 also includes a vent 155, which can be opened or closed to vent the heater tank 152. The vent 155 is linked to the actuator 5 and/or to the cover 8 such that when the actuator 5 and/or cover 8 are in the closed position (in which the brew chamber 11 is closed), the vent 155 is closed. However, if the actuator 5 and/or the cover 8 are moved from the closed position toward an open position, the vent 155 is opened to vent the heater tank 152. Unlike the orifice 6, the vent 155 may provide a relatively large cross-sectional area for flow or otherwise allow a relatively large volume of fluid at a relatively large flow rate to pass through the vent 155 when open. This may help reduce pressure in heater tank 152 to ambient pressure and/or to a pressure at which liquid is not caused to flow from the heater tank 152 to the brew chamber 11. Thus, opening the vent 155 may help prevent flow to the brew chamber 11, even if the air pump 154 continues to run, because the vent 155 releases and vents pressure in the tank 152 at a flow rate that exceeds the flow rate of the air pump 154.

The brew chamber 11 may use any beverage making ingredient, such as ground coffee, tea, a flavored drink mix, or other beverage medium, e.g., contained in a cartridge 1 or not. Alternately, the brew chamber 11 may function simply as an outlet for heated, cooled or otherwise conditioned water or other liquid, e.g., where a beverage medium is contained in the container 2. Once liquid delivery from the tank 152 to the station 11 is complete, the air pump 154 (or other air pump) may be operated to force air into the delivery line 156 to purge liquid from the brew chamber 11, at least to some extent.

Operation of the liquid pump 151, air pump 154 and other components of the apparatus 100 may be controlled by the control circuit 16, e.g., which may include a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions.

Prior to forming a beverage, the beverage machine 10 operates to suitably fill the heater tank 152 to the dispense level 159 (or to one of the dispense levels if more than one is used). To do so, the liquid pump 151 under the control of the control circuit 16 draws water from the reservoir W, which may be a cold water tank, a plumbed supply, etc. Optionally, the water may be filtered prior to entering the inlet of the liquid pump 151. The liquid pump 151 pumps water into the supply line 71, causing water to flow through the check valve 73 and the pressure relief valve 7 and to the heater tank 152. As water is forced into the heater tank 152, the liquid level in the tank 152 rises and air or other gas is forced out of the heater tank 152 and into the gas line 61. This causes air or other gas (such as water vapor) to flow through the air filter 4 and out of the orifice 6. If the vent valve 155 is open, e.g., because the actuator 5 and/or cover 8 are moved from the closed position, air or other gas may exit the heater tank 152 via the vent valve 155 as well. However, during filling of the heater tank 152, the pressure relief valve 7 may not open to vent pressure in the supply line 71, and the check valve 157 in the delivery line 156 may not open to permit flow to the brew chamber 11. Instead, the orifice 6 and the liquid pump 151 may be arranged to deliver water or other liquid to the heater tank 152 at a pressure and flow rate (e.g., 2 psi and at a flow rate of 5 ml/sec or less), and to vent air or other gas from the heater tank 152, such that pressure in the delivery line 156 and the supply line 71 do not cause the pressure relief valve 7 to open or flow to the brew chamber 11 to occur. In some embodiments, the liquid pump 151 may be operated so it is incapable of creating sufficient pressure in the heater tank 152 to cause the pressure relief valve 7 or the check valve 157 to open, e.g., because the orifice 6 vents the heater tank 152 at a sufficiently high flow rate.

Liquid is delivered to the heater tank 152 by the liquid pump 151 until a desired volume is present in the heater tank 152, e.g., determined by the control circuit 16 when the liquid level in the tank 152 reaches the dispense level 159 as detected by a conductive probe, optical sensor, pressure sensor, timed operation of the liquid pump 151, detected volume delivery by a flow meter in the supply line 71, etc. The liquid pump 151 is stopped, and if desired, liquid in the heater tank 152 is heated by the heating element 153 under the control of the control circuit 16. During heating, the liquid and/or gas in the heating tank 152 may expand in volume, and the expanding gas and/or liquid may flow into the gas line 61, through the air filter 4 and out of the orifice 6 to maintain pressure in the heater tank 152 at approximately ambient pressure. However, if the orifice 6 is clogged or otherwise not operating to vent pressure, and the delivery line 156 is blocked, the pressure relief valve 7 may open if necessary to vent pressure from the supply line 71 and the heater tank 152. This may allow relatively cooler water to be released from the liquid supply 15, rather than relatively warmer water.

With the liquid in the heater tank 152 suitably heated, if desired and as detected by a thermocouple, thermistor, or other temperature sensor linked to the control circuit 16, liquid may be delivered from the heater tank 152 to the brew chamber 11. To do so, the control circuit 16 may turn the air pump 154 on, forcing air into the gas line 61 via the air filter 4. This causes air flow into the heater tank 152, as well as through the orifice 6, and air may pass directly from the air pump 154 to the orifice 6 without passing through the air filter 4. However, the orifice 6 size or other flow restriction characteristic and the flow rate and pressure of the air pump 154 may be arranged such that pressure in the heater tank 152 rises (e.g., to about 2.5 psi or more) to force liquid to flow into the conduit 156a and into the delivery line 156 even while the orifice 6 vents pressure in the gas line 61. Reverse flow in the supply line 71 is prevented by the check valve 73, and under normal operation where the opening pressure of the pressure relief valve 7 (e.g., about 15 psi) is higher than the opening pressure of the check valve 157 (e.g., about 0.5 psi), the pressure relief valve 7 may remain closed such that liquid flows through the check valve 157 and to the brew chamber 11. If in other embodiments the opening pressure of the pressure relief valve 7 is lower than the opening pressure of the check valve 157, the pressure relief valve 7 may open during liquid delivery to the brew chamber 11, but the pressure relief valve 7 may provide a restriction to flow so that a relatively small volume of liquid exits via the pressure relief valve 7.

Operation of the air pump 154 is continued by the control circuit 16 until the liquid level in the heater tank 152 drops to the post dispense level 158 or a suitable volume of liquid is otherwise delivered to the brew chamber 11. In this illustrative embodiment, once the liquid level in the heater tank 152 drops to the post dispense level 158, air is forced into the conduit 156a and the delivery line 156, helping to purge the delivery line 156 of liquid as well as help purge beverage from the brew chamber 11. In some embodiments, a pressure sensor in the tank 152 may detect the drop in pressure in the tank 152 once the liquid level drops to the post dispense level 158 and air is forced into the delivery line 156, causing the control circuit 16 to stop air pump 154 operation, e.g., after a suitable delay to purge the delivery line 156. Alternately, a drop in pressure in the heater tank 152 may be detected by a reduced load, and thus reduced current draw, at the air pump 154. In cases where the pressure in the heater tank 152 rises to an overpressure level, e.g., while the air pump 154 is running, but the liquid inlet at the brew chamber 11 is clogged or otherwise restricts flow, and the orifice 6 does not vent suitable pressure from the heater tank 152, the pressure relief valve 7 may open to relieve pressure from the heater tank 152 (or not). The control circuit 16 may detect this condition, e.g., using a pressure sensor in the liquid supply 15, using a sensor that detects the pressure relief valve 7 opens, etc., and stop operation of the air pump 154. The control circuit 16 may prompt a user to take corrective action, e.g., by displaying a message at the user interface 14, and/or stop operation. Pressure in the heater tank 152 may also be vented if the vent valve 155 is opened by moving the actuator 5 and/or cover 8 from the closed position.

As noted above, since air from the air pump 154 is passed through the air filter 4 prior to passing to the heater tank 152, possible contaminants in the air, such as dust, may be prevented from being introduced into the heater tank 152. The air filter 4 may also help resist the passage of moisture or other materials from the gas line 61 to the air pump 154 and orifice 6, e.g., when expanding gas or liquid is caused to flow into the gas line 61 during heating in the heater tank 152, or during filling of the heater tank 152 by the liquid pump 151.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A beverage forming apparatus, comprising:
   a brew chamber arranged to hold a beverage ingredient, the brew chamber including a liquid inlet to provide liquid for combining with the beverage ingredient to form a beverage and a beverage outlet to allow beverage to exit the brew chamber;
   a liquid supply system arranged to provide the liquid to the liquid inlet;
   an air pump fluidly coupled to the liquid supply system and arranged to deliver air to the liquid supply system to pressurize at least a portion of the liquid supply system and move liquid in the liquid supply system;
   a permanently open orifice fluidly coupled to the liquid supply system and arranged to vent pressure from a portion of the liquid supply system; and
   an air filter fluidly coupled to the orifice and to the air pump such that air delivered from the air pump passes through the air filter and to the liquid supply system and such that fluid passing from the liquid supply system to the orifice passes through the air filter,
   wherein the liquid supply system includes a heater tank in which liquid is heated, and the orifice is fluidly coupled to a gas line connected to an upper portion of the heater tank,
   wherein the liquid supply system includes a delivery line that is coupled between the heater tank and the liquid inlet and is arranged to deliver heated liquid from the heater tank to the liquid inlet,
   wherein the delivery line is arranged such that pressure in the heater tank created by the air pump delivering air to the heater tank causes liquid in the heater tank to flow along the delivery line and to the liquid inlet, wherein the air pump is arranged to deliver air to the heater tank at a flow rate higher than a flow rate at which the orifice vents the heater tank, and
   wherein the delivery line includes a conduit that extends from the upper portion of the heater tank to a position between a top and a bottom of the heater tank.

2. The apparatus of claim 1, wherein the air filter has an inlet side arranged to receive air from the air pump and an outlet side arranged to deliver filtered air to the liquid supply system, wherein the orifice is fluidly coupled to the inlet side of the air filter.

3. The apparatus of claim 2, wherein the air filter and the orifice are incorporated into a single part having an inlet port coupled to the inlet side of the air filter and to the inlet side of the orifice, an outlet port coupled to an outlet side of the orifice, and a common port coupled to the outlet side of the air filter.

4. The apparatus of claim 1, further comprising a water pump arranged to deliver liquid to the heater tank, and the orifice is arranged to vent pressure from the heater tank while liquid is delivered to the heater tank by the water pump.

5. The apparatus of claim 1, wherein the brew chamber includes a cartridge holder arranged to hold a cartridge containing the beverage ingredient such that liquid is deliverable to the cartridge via the liquid inlet.

6. The apparatus of claim 1, wherein the orifice is arranged to vent pressure from the portion of the liquid supply system to ambient pressure, and the orifice has a size of 0.25 mm.

7. A beverage forming apparatus, comprising:
a brew chamber arranged to hold a beverage ingredient, the brew chamber including a liquid inlet to provide liquid for combining with the beverage ingredient to form a beverage and a beverage outlet to allow beverage to exit the brew chamber;
a liquid supply system arranged to provide the liquid to the liquid inlet;
an air pump fluidly coupled to the liquid supply system and arranged to deliver air to the liquid supply system to pressurize at least a portion of the liquid supply system and move liquid in the liquid supply system;
a permanently open orifice fluidly coupled to the liquid supply system and arranged to vent pressure from a portion of the liquid supply system; and
an air filter fluidly coupled to the orifice and to the air pump such that air delivered from the air pump passes through the air filter and to the liquid supply system and such that fluid passing from the liquid supply system to the orifice passes through the air filter,
wherein the liquid supply system includes a heater tank in which liquid is heated, and the orifice is fluidly coupled to a gas line connected to an upper portion of the heater tank,
wherein the air filter has an inlet side arranged to receive air from the air pump and an outlet side arranged to deliver filtered air to the liquid supply system, wherein the orifice is fluidly coupled to the inlet side of the air filter, and
wherein the air filter and the orifice are incorporated into a single part having an inlet port coupled to the inlet side of the air filter and to the inlet side of the orifice, an outlet port coupled to an outlet side of the orifice, and a common port coupled to the outlet side of the air filter.

8. A method of forming a beverage, comprising:
providing a beverage ingredient in a brew chamber of a beverage forming apparatus, the beverage ingredient arranged to form a beverage when combined with a liquid;
pumping liquid to a heater tank of a liquid supply system;
venting pressure from the heater tank during the pumping of liquid to the heater tank, pressure being vented from the heater tank via a gas line connected to the heater tank and that includes a permanently open orifice; and
delivering pressurized air from an air pump to the heater tank via an air filter and the gas line such that the heater tank is pressurized and liquid is delivered to the brew chamber to combine with the beverage ingredient
wherein the gas line is connected to an upper portion of the heater tank,
wherein the air filter has an inlet side arranged to receive air from the air pump and an outlet side arranged to deliver filtered air to the heater tank, wherein the outlet side of the air filter is fluidly coupled to the heater tank, and the inlet side of the air filter is fluidly coupled to the orifice, and
wherein the air filter and the orifice are incorporated into a single part having an inlet port coupled to the inlet side of the air filter and to an inlet side of the orifice, an outlet port coupled to an outlet side of the orifice, and a common port coupled to the outlet side of the air filter.

9. The method of claim 8, wherein liquid is delivered to the brew chamber via a delivery line coupled between the heater tank and the brew chamber.

10. The method of claim 9, wherein the delivery line includes a conduit that extends from the upper portion of the heater tank to a position between a top and a bottom of the heater tank.

11. The method of claim 8, wherein the orifice is arranged to vent pressure from the heater tank to ambient pressure and has a size of 0.25 mm.

12. The method of claim 8, wherein the brew chamber includes a cartridge holder arranged to hold a cartridge containing the beverage ingredient such that liquid is deliverable to the cartridge from the heater tank.

13. The method of claim 8, wherein the step of delivering pressurized air from an air pump includes venting pressure from the heater tank via the permanently open orifice while pressurized air is delivered to the heater tank.

14. A method of forming a beverage, comprising:
providing a beverage ingredient in a brew chamber of a beverage forming apparatus, the beverage ingredient arranged to form a beverage when combined with a liquid;
pumping liquid to a heater tank of a liquid supply system;
venting pressure from the heater tank during the pumping of liquid to the heater tank, pressure being vented from the heater tank via a gas line connected to the heater tank and that includes a permanently open orifice; and
delivering pressurized air from an air pump to the heater tank via an air filter and the gas line such that the heater tank is pressurized and liquid is delivered to the brew chamber to combine with the beverage ingredient,
wherein the gas line is connected to an upper portion of the heater tank,
wherein liquid is delivered to the brew chamber via a delivery line coupled between the heater tank and the brew chamber, and
wherein the delivery line includes a conduit that extends from the upper portion of the heater tank to a position between a top and a bottom of the heater tank.

* * * * *